United States Patent [19]

Shafer et al.

[11] Patent Number: 5,777,043
[45] Date of Patent: Jul. 7, 1998

[54] SEALANT FORMULATIONS CONTAINING HIGH VINYL CONTENT HYDROGENATED STYRENE-BUTADIENE-STYRENE BLOCK COPOLYMERS

[75] Inventors: David Lee Shafer, Houston; Linda Joanne Oliveri, Katy; Glenn Roy Himes, Houston, all of Tex.

[73] Assignee: Shell Oil Company, Houston, Tex.

[21] Appl. No.: 811,487

[22] Filed: Mar. 5, 1997

[51] Int. Cl.$^6$ .................................................. C08C 19/02
[52] U.S. Cl. .......................... 525/339; 525/99; 525/333.3
[58] Field of Search ........................... 525/99, 333.3, 525/339

[56] References Cited

U.S. PATENT DOCUMENTS 5,591,154   1/1997   Dare et al. ........................ 604/387

OTHER PUBLICATIONS

Holden, G.J. Elastomers Plast. (1982) pp. 148–154.

Primary Examiner—Melvyn I. Marquis
Assistant Examiner—D. Aylward
Attorney, Agent, or Firm—Donald F. Haas

[57] ABSTRACT

This invention provides sealant compositions which comprise a hydrogenated styrene-butadiene-styrene (SEBS) block copolymer which has an overall weight average molecular weight of from 30,000 to 300,000, a styrene block weight average molecular weight of from 4000 to 35,000, and a vinyl content of at least 45% by weight (% wt), preferably 45 to 90%, and an adhesion promoting resin. For every 100 parts by weight of copolymer, there should be at least 20 parts of adhesion promoting resin.

3 Claims, No Drawings

5,777,043

1

SEALANT FORMULATIONS CONTAINING HIGH VINYL CONTENT HYDROGENATED STYRENE-BUTADIENE-STYRENE BLOCK COPOLYMERS

FIELD OF THE INVENTION

This invention relates to sealant compositions for use as insulation against air and moisture, sound-deadening, and other functions in construction, automotive, and consumer applications. More particularly, this invention relates to such compositions containing new high vinyl content hydrogenated styrene-butadiene-styrene (SEBS) block copolymers.

BACKGROUND OF THE INVENTION

There are at least two major criteria in formulating a sealant composition. The sealant must possess some degree of slump resistance at high service temperatures. Additionally, the sealant should have a good working viscosity in the melt so it can be easily coated on to various substrates.

Styrene-butadiene-styrene block copolymers are known to be useful for sealants because of their combination of strength and elastomeric properties. Hydrogenated versions of these polymers (SEBS) are especially useful because of their enhanced resistance to oxidation and chemical attack. These polymers give the compositions in which they are used excellent high temperature resistance properties but they tend to be high in molecular weight and thus so high in viscosity that it is difficult to coat the sealants made with them.

Quite adequate sealant compositions have been made using some of the lower molecular weight polymers of this type but sacrifices in terms of high temperature properties must be accepted. The large styrene endblocks in the higher molecular weight SEBS polymers are resistant to flow but give excellent high service temperature performance. Examples of compromise solutions are the use of a lower molecular weight polymer and blending in a relatively low molecular diblock polymer of this type. Thus it can be seen that it would be advantageous to be able to make an easily coatable sealant composition and retain or enhance the high temperature properties achievable with the higher molecular weight SEBS polymers.

This invention provides the advantages of both low molecular weight polymers and higher molecular weight polymers while minimizing their disadvantages. Using the high vinyl content polymers of the present invention in an sealant application allows sealants with high service temperature properties which have a sufficiently low viscosity to be easily coatable. The present wisdom in this art suggests that high service temperatures and a reduction of application viscosity may be mutually exclusive for sealants. This invention provides a novel way to produce compositions which exhibit both of these characteristics.

SUMMARY OF THE INVENTION

This invention provides sealant compositions which comprise a hydrogenated styrene-butadiene-styrene (SEBS) block copolymer which has an overall weight average molecular weight of from 30,000 to 300,000, a styrene block weight average molecular weight of from 4,000 to 35,000, and a vinyl content of at least 45% by weight (% wt), preferably 45 to 90%, and adhesion-promoting resins such as tackifying resins, and, optionally, polystyrene block reinforcing resins, flow promoting resins, and oils, polyolefins,

2 fillers, waxes, and solvents. For every 100 parts by weight of copolymer, there should be at least 20 and preferably 60 to 350 parts by weight of resin.

The preferred structure for the block copolymers used herein is linear, i.e., S-EB-S. However, block copolymers having branched, radial, and star structures may also be useful in this invention. Such structures may be generically represented by the formula $(A-B)_x$-Y where A is a polymer block of styrene, B is a polymer block of hydrogenated butadiene, and Y is a coupling agent.

DETAILED DESCRIPTION OF THE INVENTION

The endblocks of these novel copolymers are polymer blocks of styrene. Other vinyl aromatic hydrocarbons could be used, including alphamethyl styrene, various alkyl-substituted styrenes, alkoxy-substituted styrenes, vinyl naphthalene, vinyl toluene and the like.

The butadiene used herein must produce a polymer block with a high vinyl content. In other words, the percent of 1,2 addition of the butadiene should be at least 45% wt, preferably 45 to 90% wt. Below 45 % wt, polymer viscosity is similar to conventional polymers and there is no advantage. Above 90% wt, the viscosity decrease has reached a plateau and no longer drops with higher 1,2 content. Therefore, there is no further advantage.

Anionic polymerization of conjugated diene hydrocarbons with lithium initiators is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

X-B-Li

X-A-B-Li

X-A-B-A-Li

Li-B-Y-B-Li

Li-A-B-Y-B-A-Li wherein B represents polymerized units of one or more conjugated diene hydrocarbons such as butadiene or isoprene, A represents polymerized units of one or more vinyl aromatic compounds such as styrene, X is the residue of a monolithium initiator such as sec-butyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or ethyl glyme (1,2-diethoxyethane) to obtain the desired amount of 1,2-addition. As described in U.S. Pat. No. Re 27,145 which is incorporated by reference herein, the level of 1,2-addition of a butadiene polymer or copolymer can greatly affect elastomeric properties after hydrogenation. The 1,2-addition of butadiene polymers significantly and surprisingly additionally influences the polymer as described above. A 1,2-addition of about 40% is achieved during polymerization at 50° C. with about 6% by volume of diethylether or about 200 ppm of ethyl glyme in the final solution. A 1,2 addition of about 47% (within the scope of this invention) is achieved during polymerization by the presence of about 250 ppm of ortho-dimethoxybenzene (ODMB) in the final solution. A 1,2 addition of 78% (within the scope of this invention) is achieved during polymerization by the presence of about 300 ppm of 1,2-diethoxypropane (DEP) in the final solution.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like.

The hydrogenation of these polymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in polydiene blocks of less than about 1 percent, and preferably as close to 0 percent as possible, of their original unsaturation content prior to hydrogenation. A titanium catalyst such as disclosed in U.S. Pat. No. 5,039,755, which is herein incorporated by reference, may also be used in the hydrogenation process.

The molecular weights of linear polymers or unassembled linear segments of polymers such as mono-, di-, triblock, etc., or the arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. The materials used in the columns of the GPC are styrene-divinyl benzene gels or silica gels. The solvent is tetrahydrofuran and the detector is a refractive index detector.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

The invention accordingly provides a sealant composition comprising a styrene-alkylene-styrene block copolymer whose polyalkylene blocks comprise ethylene/butylene units and an adhesion promoting resin. The hydrogenated styrene-butadiene-styrene (SEBS) block copolymer has an overall weight average molecular weight of from 30,000 to 300,000, preferably 45,000 to 200,000, a styrene block weight average molecular weight of from 4,000 to 35,000, preferably 5,000 to 32,000, and a vinyl content of at least 45% by weight (% wt), preferably 45 to 90%.

In sealant applications, it is common practice to add an adhesion promoting or tackifying resin that is compatible with the polymer, generally from 20 to 400 parts per hundred parts of polymer by weight (pbw), preferably 60 to 350 pbw. For every 100 parts by weight (pbw) of copolymer, there should be at least 20 pbw of resin to achieve the low viscosity and economics required for sealant applications. No more than 400 pbw adhesion promoting resin per 100 parts polymer can be used or the sealant will not have the visco-elastic properties required to resist flow after application.

A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15% 2-methyl-2-butene and about 10% dimer as taught in U.S. Pat. No. 3,577,398. Other tackifying resins may be employed wherein the resinous copolymer comprises 20–80 weight percent of piperylene and 80–20 weigh percent of 2-methyl-2-butene. The resins normally have ring and ball softening points as determined by ASTM method E28 between about 80° C. and 115° C.

Aromatic resins may also be employed as reinforcing agents, provided that they are compatible with the particular polymer used in the formulation. Normally, these resin should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. Softening points of solid resins may be from about 40° C. to about 140° C. Liquid resins, i.e., softening points less than room temperature, may be used as well as combinations of solid and liquid resins. The selection of the particular tackifying agent is, in large part, dependent upon the specific polymer employed in the respective sealant composition.

A composition of the instant invention may contain plasticizers, such as rubber extending plasticizers, or compounding oils or organic or inorganic pigments and dyes. Rubber compounding oils are well-known in the art and include both high saturates content oils and naphthenic oils. Preferred plasticizers are highly saturated oils, e.g. Tufflo® 6056 and 6204 oil made by Arco and naphthenic process oils, e.g. Shellflex® 371 oil made by Shell. The amounts of rubber compounding oil employed in the invention composition can vary from 0 to about 150 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in sealant formulations. This is especially true for exterior sealants in which fillers are added not only to create the desired appeal but also to improve the performance of the sealant such as its weatherability. A wide variety of fillers can be used. Suitable fillers include calcium carbonate, clays, talcs, silica, zinc oxide, titanium dioxide and the like. The amount of filler usually is in the range of 0 to about 65% wt based on the solvent free portion of the formulation depending on the type of filler used and the application for which the sealant is intended. An especially preferred filler is titanium dioxide.

If the sealant will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% wt in the solvent blend.

Combinations of primary and secondary antioxidants are preferred. Such combinations include sterically hindered phenolics with phosphites or thioethers, such as hydroxyphenylpropionates with aryl phosphites or thioethers, or amino phenols with aryl phosphites. Specific examples of useful antioxidant combinations include 3-(3,5-di-t-butyl-4-hydroxyphenyl)propionate)methane (Irganox® 1010 from Ciba-Geigy) with tris(nonylphenyl)-phosphite (Polygard® HR from Uniroyal), Irganox® 1010 with bis(2,4-di-t-butyl) pentaerythritol diphosphite (Ultranox® 626 from Borg-Warner).

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

All sealant compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the polymers of this invention to prepare sealants having properties suitable for many different applications.

The sealant compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

Sealant compositions of this invention can be used for many applications. Particularly preferred is their use as gap fillers for constructions which will be baked (for example, in a paint baking oven) after the sealant is applied. This would include their use in automobile manufacture and in appliance manufacture. Another preferred application is their use in gasketing materials, for example, in lids for food and beverage containers. The unhydrogenated precursors may also be used in these applications.

Variations of sealant compositions that are subjects of this invention will include adhesives, such as contact and structural adhesives, mastics, diaper assembly and personal care adhesives, and laminating adhesives. Especially useful will be the low viscosity characteristic of high vinyl ethylene/butylene rubber blocks for ease of adhesive application, e.g., sprayability.

EXAMPLES

PP5828 is an SEBS Block copolymer with a high vinyl content. Its molecular characteristics are compared with those of Polymer A, a commercial polymer whose viscosity is considered too high for most, if not all, commercial sealant applications, and others in Table 1 below. It can be seen that PP5828 and Polymer A are very similar except for the vinyl content: 78% of the rubber block of PP5828 is in a 1,2 microstructure compared to 38% for Polymer A. The flow properties of PP5828 are dramatically better than Polymer A as indicated by sealant viscosity (more than an order of magnitude lower). Polymer B is the block copolymer of this type that is currently used to make sealant formulations commercially. The sealant viscosity of the formulation of this invention, made with PP5828, is one fifth of that of the formulation made with Polymer B while the SAFT and slump temperature are the same. Similarly, PP5823 (78% 1,2 addition) exhibits much lower sealant viscosity than either Polymer A or B. PP5819 has an intermediate level of 1,2 structure (47%), but is still markedly better (lower) in sealant viscosity than Polymers A or B. The low sealant viscosity means that the sealant composition can be mixed, pumped, and applied more easily than sealants with higher viscosity.

TABLE 1

Polymer Descriptions

| Polymer | MW (real) | SEBS Block Description | 1,2 Bd level | PSC |
|---|---|---|---|---|
| A | 67,000 | 10-47-10 | 38% | 29.9% |
| PP-5828 | 56,000 | 10-39-10 | 78% | 29.6% |
| B | 50,000 | 7.5-35-7.5 | 38% | 30% |
| PP-5819 | 38,000 | 6-26-6 | 47% | 29.5% |
| PP-5823 | 35,000 | 6-23-6 | 78% | 29.3% |

TABLE 2

Sealant Results

| Polymer | Sealant Viscosity at 350° F. (cP) | Shear Adhesion Failure Temperature (°C.) | Slump Temperature (°C.) |
|---|---|---|---|
| A | 33,500 | 73 | 105 |
| PP-5828 | 1,190 | 54.5 | 80 |
| B | 5,280 | 54.1 | 80 |
| PP-5819 | 1,800 | 52.6 | 60 |
| PP-5823 | 400 | 48.1 | 55 |

Temperature dependent properties, such as shear adhesion failure temperature (SAFT) and slump temperature, and melt viscosity were measured. A Brookfield Viscometer model RVTD and spindle 29 was used to measure the viscosity at 177° C. To measure the slump temperature, the sealant formulations were poured hot and allowed to solidify in metal channels with the following dimensions: 2.5 cm wide, by 2.5 cm high, and 1.25 cm deep. The channels were placed vertically in an oven and the temperature was raised in 5° C. increments, allowing the sample to equilibrate for 30 minutes at each temperature before increasing the temperature again. The slump temperature was the temperature at which the sample sagged more than 3/16 inch in the channel. SAFT was determined on a lap-shear bond of 2.5 cm×2.5 cm area on an aluminum surface under a load of 190 g. The temperature was ramped up from 40° C. in 5° C. increments every 10 minutes until bond failure occurred.

We claim:

1. A high service temperature sealant composition which comprises:
   (a) 100 parts by weight of a hydrogenated styrene-butadiene-styrene block copolymer which has an overall weight average molecular weight of from 30,000 to 300,000, a styrene block weight average molecular weight of from 4000 to 35,000, and wherein the diene block has a vinyl content of 45% to 90% by weight, and
   (b) at least 20 parts by weight of an adhesion promoting resin.

2. The sealant composition of claim 1 wherein the adhesion promoting resin is present in an amount of from 20 to 400 parts by weight per 100 parts of copolymer.

3. The sealant composition of claim 1 wherein the overall weight average molecular weight is from 45,000 to 200,000 and the styrene block molecular weight is from 5,000 to 32,000.

* * * * *